United States Patent
Sheets et al.

(10) Patent No.: US 10,843,649 B2
(45) Date of Patent: Nov. 24, 2020

(54) SYSTEM FOR PROVIDING PROTECTION TO A TRACK TYPE TRACTOR

(71) Applicant: Caterpillar Inc., Deerfield, IL (US)

(72) Inventors: Kevin Andrew Sheets, Washington, IL (US); Eric Michael Wank, Metamora, IL (US); Fernando Carrillo, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 53 days.

(21) Appl. No.: 16/133,770

(22) Filed: Sep. 18, 2018

(65) Prior Publication Data

US 2020/0086818 A1    Mar. 19, 2020

(51) Int. Cl.
| B62D 33/06 | (2006.01) |
| B60R 21/02 | (2006.01) |
| B62D 55/06 | (2006.01) |

(52) U.S. Cl.
CPC ............. B60R 21/02 (2013.01); B62D 33/06 (2013.01); B62D 55/06 (2013.01)

(58) Field of Classification Search
CPC ........ A01D 87/08; B62D 49/00; B62D 33/06; B62D 33/0617; B62D 55/06
See application file for complete search history.

(56) References Cited

U.S. PATENT DOCUMENTS

| 3,578,377 A | 5/1971 | Babbitt, Jr. et al. |
| 4,023,851 A | 5/1977 | Palmer et al. |
| 4,050,735 A | 9/1977 | Molnar |
| 4,102,537 A | 7/1978 | Takahashi et al. |
| 6,189,955 B1 * | 2/2001 | Fryk .................... B60Q 1/0035 296/190.08 |
| 6,769,732 B2 * | 8/2004 | Sakyo .................... B60R 21/131 296/190.03 |
| 7,775,530 B2 * | 8/2010 | Darling, III ........... A61G 1/013 280/47.18 |
| 8,029,044 B2 * | 10/2011 | Akahane .................. E02F 9/163 296/190.08 |
| 8,303,026 B2 * | 11/2012 | Yamashita ......... B62D 33/0617 296/146.16 |
| 8,342,555 B2 * | 1/2013 | Ball ....................... B62K 3/005 280/278 |
| 8,684,410 B2 * | 4/2014 | Kwon ..................... B60R 21/13 280/756 |

(Continued)

FOREIGN PATENT DOCUMENTS

| EP | 2402235 A3 * | 8/2015 | ............ B62D 25/04 |
| GB | 2441522 | 3/2008 | |
| WO | 2011047593 | 4/2011 | |

*Primary Examiner* — Nicole T Verley

(57) ABSTRACT

A system for providing protection to a track type tractor includes a sweep arrangement having a pair of arms that are supported on a cab of the track type tractor. The pair of arms have first ends that are disposed rearwardly of the cab. The pair of arms also extend forward of an engine compartment of the track type tractor and have second ends that are coupled with a housing of the engine compartment. The system also includes a cross-brace having a pair of clamps and a bar. The clamps are releasably fastened onto the pair of arms of the sweep arrangement and located at an anterior region of the track type tractor. The bar has a pair of ends that are releasably fastened to proximal ends of the pair of clamps.

20 Claims, 5 Drawing Sheets

(56) References Cited

U.S. PATENT DOCUMENTS

| | | | |
|---|---|---|---|
| 8,714,629 B2* | 5/2014 | Takeoka | B62D 25/07 296/190.03 |
| 9,592,782 B2* | 3/2017 | Raska | B60G 3/20 |
| 2009/0007461 A1* | 1/2009 | Pelletier | B62D 55/06 37/219 |
| 2014/0288763 A1* | 9/2014 | Bennett | B62D 55/112 701/31.6 |
| 2016/0152284 A1* | 6/2016 | Wiese | B62D 33/0617 296/190.1 |

* cited by examiner

SYSTEM FOR PROVIDING PROTECTION TO A TRACK TYPE TRACTOR

TECHNICAL FIELD

The present disclosure relates to a tractor type tractor. More particularly, the present disclosure relates to a system for providing protection to a track type tractor.

BACKGROUND

Track type tractors have been known for their use in a variety of applications such as mining, forestry, and agriculture. For instance, in the forestry application, these track type tractors may be used for sweeping debris away from a given location. However, it has been observed that conventional designs of tractors have a configuration that is less than desirable for protecting components of the tractor from debris that may fall onto the tractor during operation. An example of such a conventional design, in this case—using a safety frame to protect the operator alone, may be found in the disclosure of U.S. Pat. No. 4,102,537.

Additionally, in some cases, when maneuvering through covered terrain where foliage sweep across the machine, the tractor may encounter trees or shrubs that could be uprooted from the soil and fall over the tractor. To prevent damage from such falling debris, the tractor may be provided with an upper frame and some reinforcement bars that are typically welded to the upper frame of the tractor. However, in such cases, the welded reinforcement bars may yield to vibrations during operation of the tractor and/or fail from impacts encountered when debris falls over the welded reinforcement bars.

Hence, there is a need for a system for providing protection to a track type tractor while overcoming the aforementioned drawbacks.

SUMMARY OF THE DISCLOSURE

In an aspect of this disclosure, a cross-brace for a sweep arrangement of a track type tractor includes a pair of clamps and a bar. The pair of clamps are adapted for releasably fastening onto a pair of arms of the sweep arrangement. The bar has a pair of ends that are releasably fastened to proximal ends of the pair of clamps.

In another aspect of the present disclosure, a system for providing protection to a track type tractor includes a sweep arrangement having a pair of arms supported on a cab of the track type tractor. The pair of arms have first ends that are disposed rearwardly of the cab. The pair of arms also extend forward of an engine compartment of the track type tractor and have second ends that are coupled with a housing of the engine compartment. The system also includes a cross-brace having a pair of clamps and a bar. The clamps are releasably fastened onto the pair of arms of the sweep arrangement and located at an anterior region of the track type tractor. The bar has a pair of ends that are releasably fastened to proximal ends of the pair of clamps.

In yet another aspect of the present disclosure, a track-type tractor includes a frame, a cab supported on the frame, and an engine compartment located forwardly of the cab. The engine compartment has an engine supported on the frame and a housing enclosing the engine therein. The track-type tractor further includes a sweep arrangement and a cross-brace. The sweep arrangement has a pair of arms supported on the cab. The pair of arms have first ends that are disposed rearwardly of the cab. The pair of arms extend forwardly of the engine compartment and have second ends coupled with the housing of the engine compartment. The cross-brace has a pair of clamps and a bar. The clamps are releasably fastened onto the pair of arms of the sweep arrangement and located at an anterior region of the track type tractor. The bar has a pair of ends that are releasably fastened to proximal ends of the pair of clamps.

Other features and aspects of this disclosure will be apparent from the following description and the accompanying drawings.

DETAILED DESCRIPTION

Reference will now be made in detail to specific embodiments or features, examples of which are illustrated in the accompanying drawings.

Figure 1:
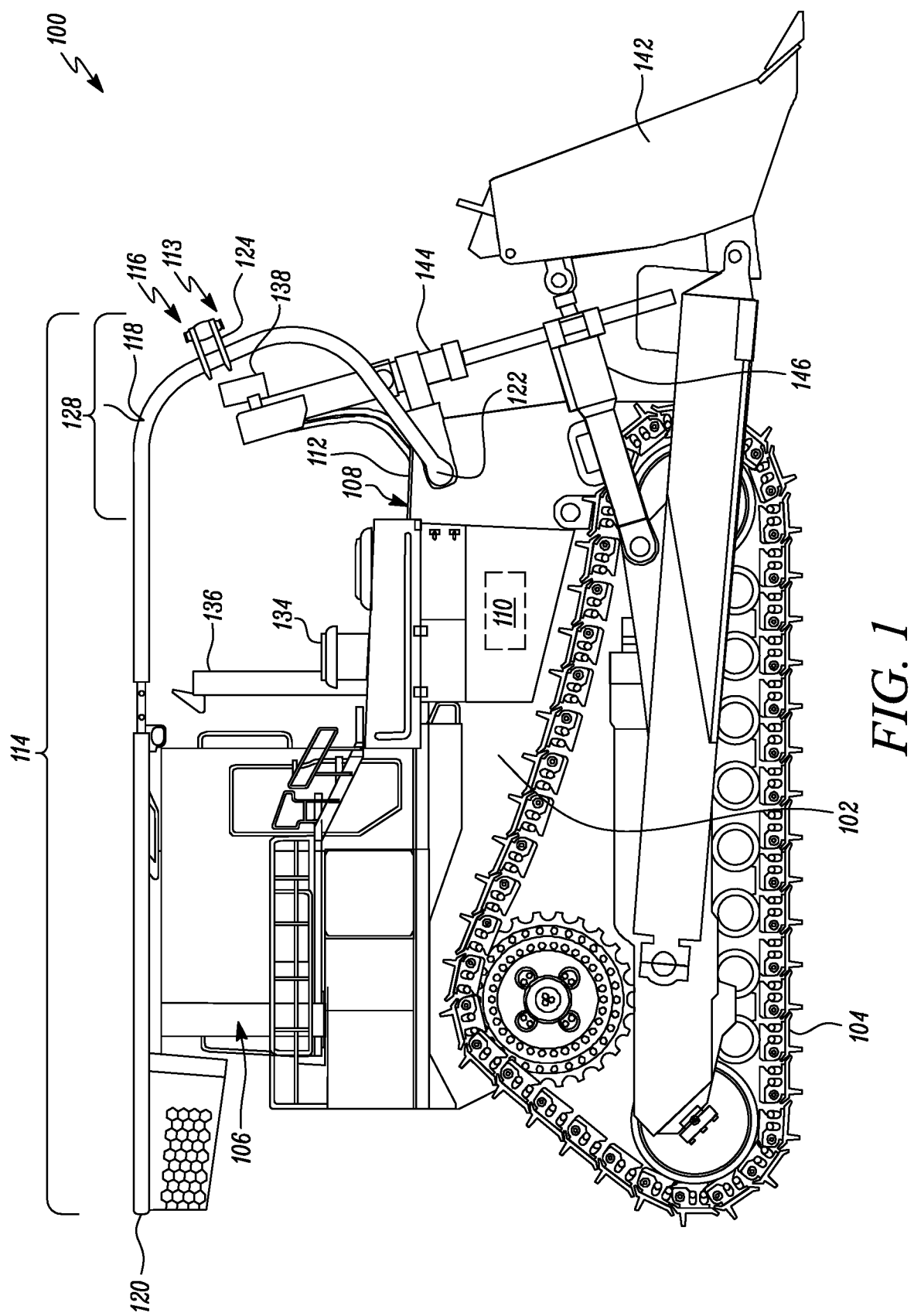
FIG. 1 is a side view of a track type tractor in accordance with an embodiment of the present disclosure.
Figure 2:
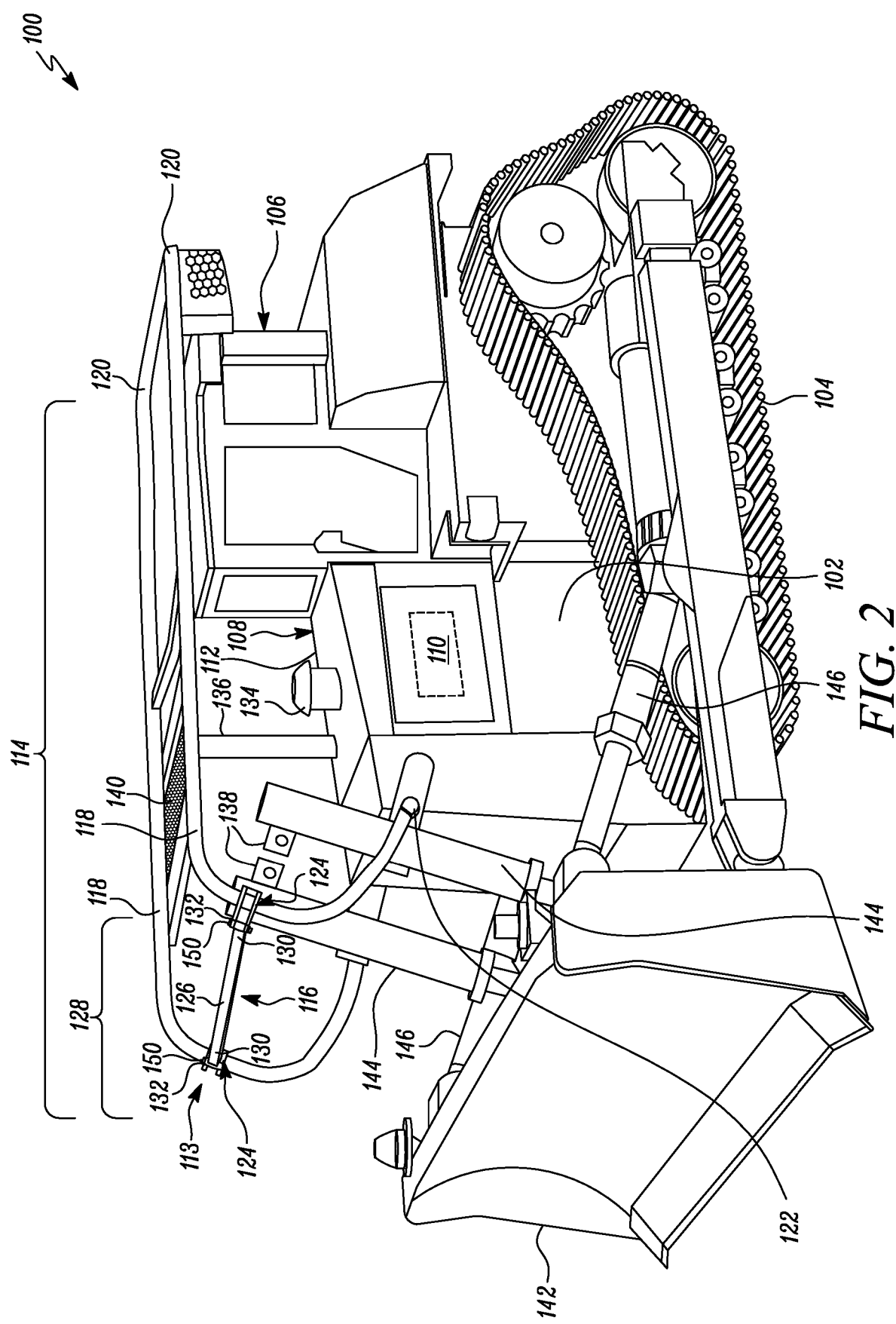
FIG. 2 is a front perspective view of the track type tractor.

Referring to FIGS. 1 and 2, a track type tractor 100 (TTT) is depicted according to an embodiment herein. As shown, the TTT 100 includes a frame 102. The frame 102 is configured to rotatably support a pair of ground engaging members 104, for example, a pair of tracks thereon, of which only one ground engaging member 104 is visible in each of the views of FIGS. 1-2 respectively. Further, as shown, the TTT 100 also includes a cab 106 that is supported on the frame 102. The cab 106 may be configured to house one or more controls (not shown), for example, switches, levers, and other control elements for allowing an operator to control an operation of the TTT 100. Furthermore, the TTT 100 may also include a work implement 142, for example, a dozing implement for operatively performing a work-related function. The TTT 100 may further include a pair of lift actuators 144 and a pair of tilt actuators 146 for operatively moving the work implement 142 relative to the frame 102. Additionally, or optionally, the TTT 100 may also include one or more service lights 138 adjacent the lift actuators 144 for illuminating a work area located in the vicinity of the working implement.

Further, as shown in FIGS. 1 and 2, the TTT 100 also includes an engine compartment 108 that is located forwardly of the cab 106. The engine compartment 108 has an engine 110 that is supported on the frame 102 and a housing 112 that encloses the engine 110 therein. Additionally, the housing 112 of the engine compartment 108 may also be configured to support an air inlet system 134 and an air exhaust system 136 as shown in the illustrated embodiments of FIGS. 1 and 2.

Figure 3:
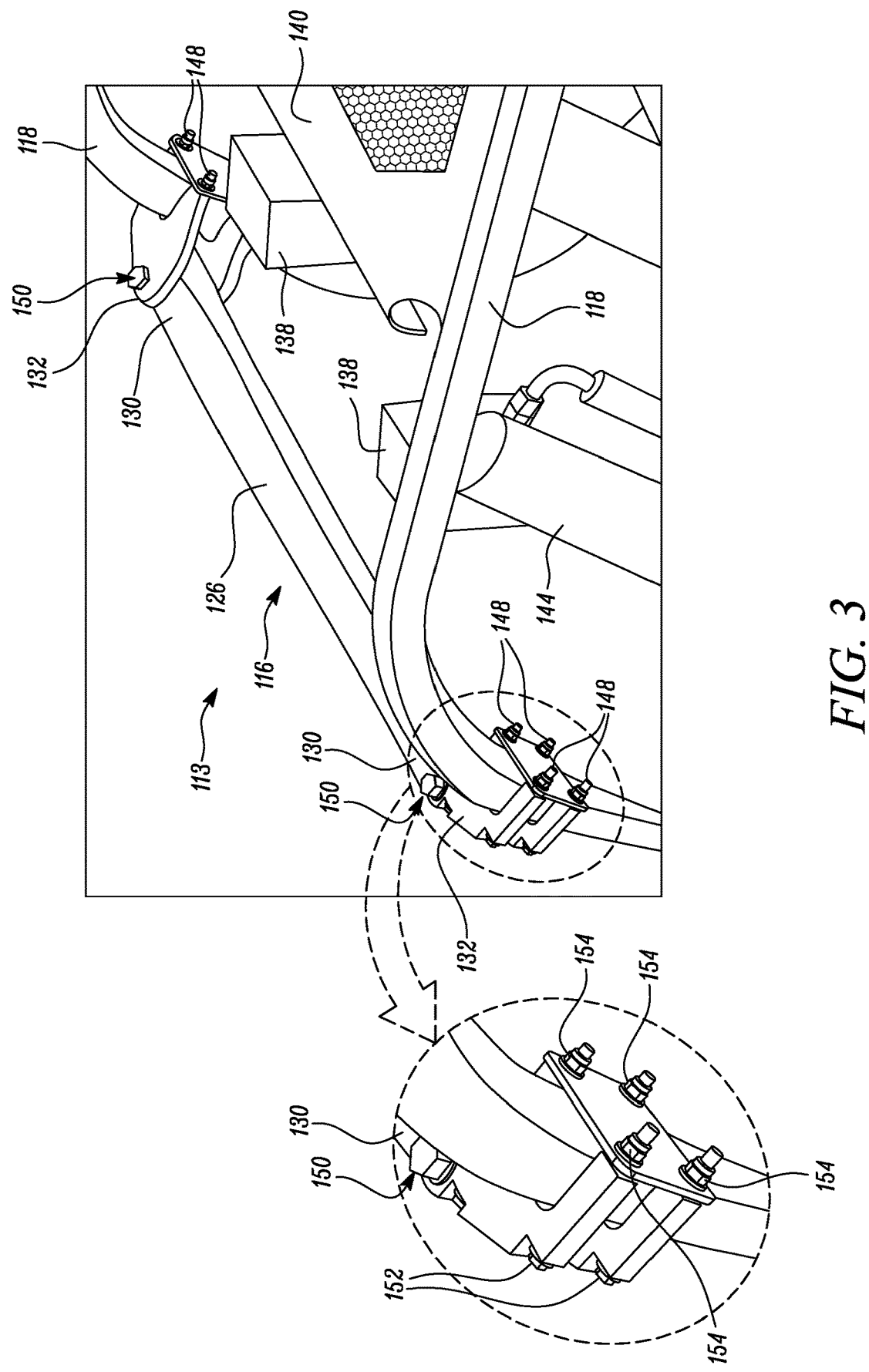
FIG. 3 is a top perspective view of a system for providing protection to the track type tractor, according to an embodiment of the present disclosure.

As shown in FIGS. 1-3, the TTT 100 also includes a sweep arrangement 114 and a cross-brace 116. The sweep arrangement 114 has a pair of arms 118 supported on the cab 106. These pair of arms 118 have first ends 120 that are disposed rearwardly of the cab 106. The pair of arms 118 are also configured to extend forwardly of the engine compartment 108 and have second ends 122 coupled with the housing 112 of the engine compartment 108. Additionally, or optionally, the sweep arrangement 114 may also include a cover module 140 attached to the pair of arms 118 and disposed above the engine compartment 108.

Further, the cross-brace 116 has a pair of clamps 124. The clamps 124 are releasably fastened onto the pair of arms 118 of the sweep arrangement 114 and located at an anterior region 128 of the TTT 100. In embodiments herein, the system 113 also includes at least a pair of fastening arrangements 148, for example, four fastening arrangements 148 as best shown in the illustrated embodiment of FIG. 3. These fastening arrangements 148 are used for clamping each clamp 124 to an associated arm 118 of the TTT 100.

Moreover, as shown in the illustrated embodiment of FIG. 3, each of these fastening arrangements 148 is embodied in the form of a threaded bolt 152 and a locknut 154. Although the threaded bolt 152 and the locknut 154 are depicted in the illustrated embodiment of FIG. 3, a type of fastening arrangement is non-limiting of this disclosure. It will be acknowledged by persons skilled in the art that other types of fastening arrangements such as, but not limited to, quick release catch mechanisms or clamp mechanisms can be configured for use with each of the clamps 124 in place of the threaded bolt 152 and the locknut 154 for releasably securing the clamps 124 to corresponding ones of the arms 118.

Furthermore, the cross-brace 116 has a bar 126. The bar 126 has a pair of ends 130 that are releasably fastened to proximal ends 132 of the pair of clamps 124. As shown in FIG. 3, each end 130 of the bar 126 is releasably fastened to an associated proximal end 132 of a corresponding clamp 124 via a hinge joint 150. This hinge joint 150 allows relative movement between the pair of clamps 124 when the pair of arms 118 of the sweep arrangement 114 move relative to one another during operation of the TTT 100.

Figure 4:
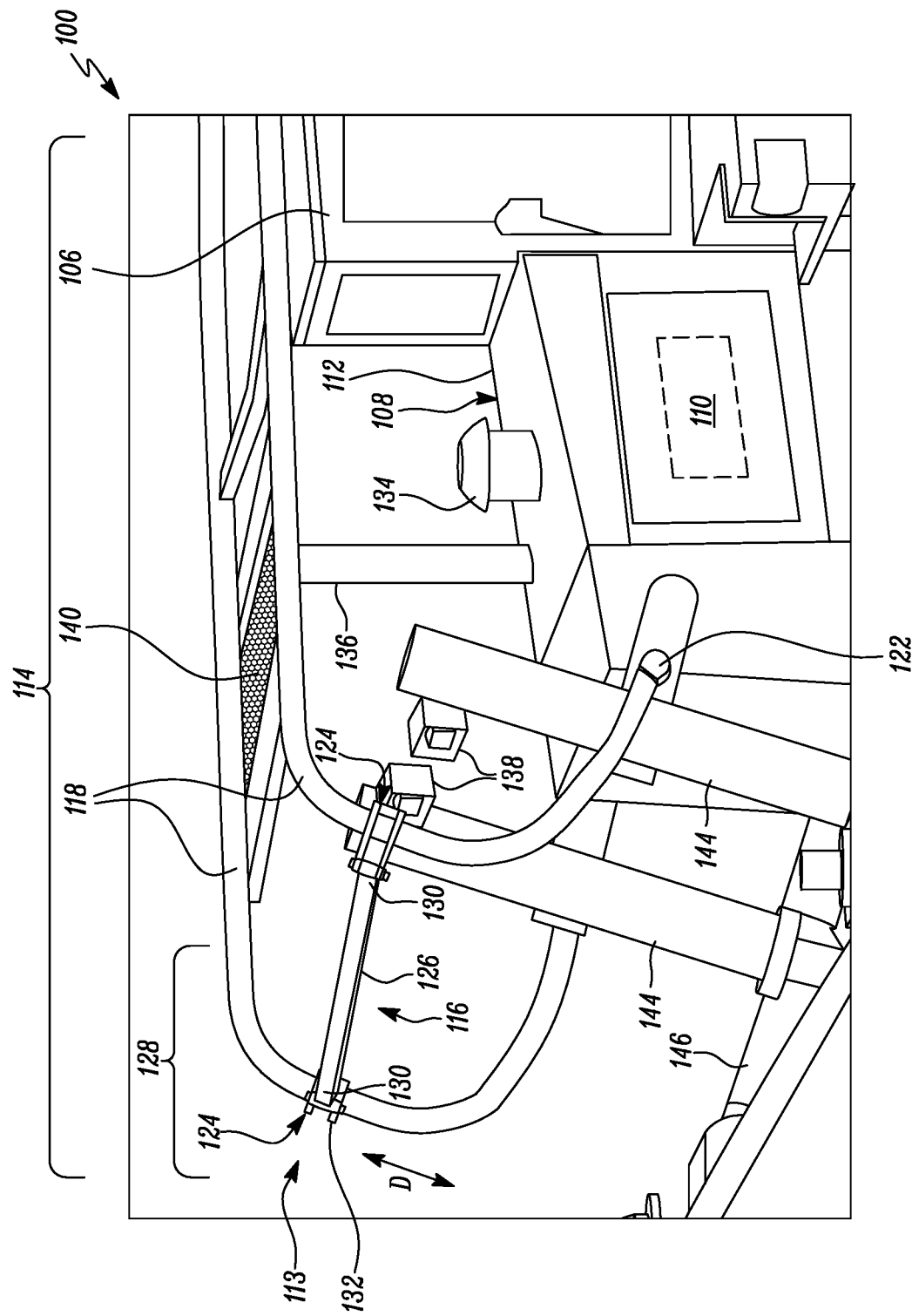
FIGS. 4 and 5 are zoomed-in front perspective views of an anterior region of the track type tractor showing an adjustable positioning of a cross-brace that is associated with the system for providing protection to the track type tractor, according to an embodiment of the present disclosure.
Figure 5:
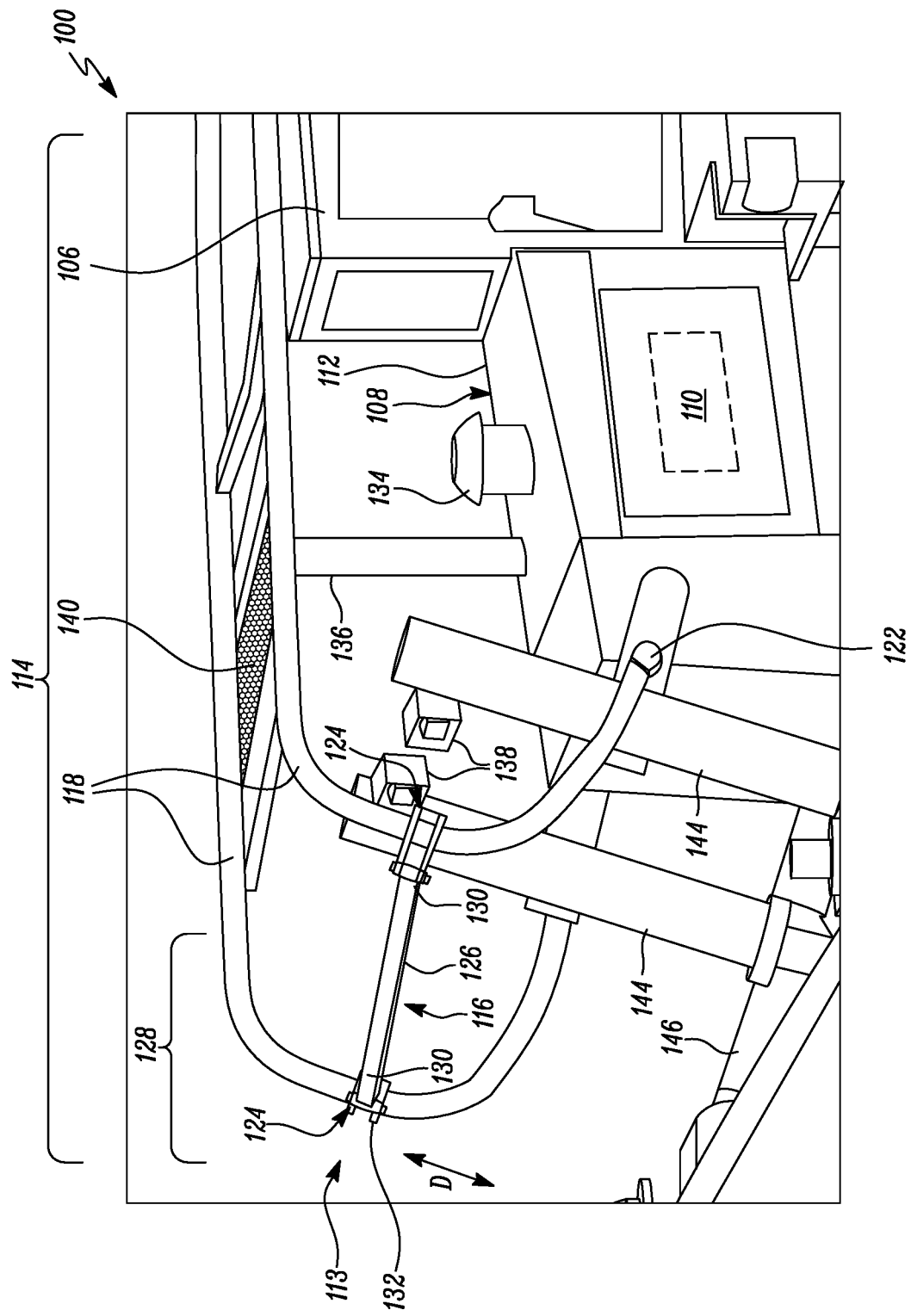

In embodiments herein, a size and shape of an inner circumference of each clamp 124 would be configured to correspond with a cross-section of the associated arm 118. Moreover, as shown by way of a bi-directional arrow D in the view of FIGS. 4 and 5 respectively, the pair of clamps 124 are adjustable in position along a length of respective ones of the pair of arms 118. Depending on various factors such as, but not limited to, visibility desired by the operator of the TTT 100 and a type of environment in which the TTT 100 is being operated, the cross-brace 116 could be adjusted to a desired position along the arms 118 by merely loosening the fastening arrangements 148 and retightening them so as to secure the clamps 124 to the arms 118 at the desired position.

Various embodiments disclosed herein are to be taken in the illustrative and explanatory sense and should in no way be construed as limiting of the present disclosure. All joinder references (e.g., associated, coupled, connected, secured, and the like) are only used to aid the reader's understanding of the present disclosure, and may not create limitations, particularly as to the position, orientation, or use of the components disclosed herein. Therefore, joinder references, if any, are to be construed broadly.

Additionally, all positional terms, such as, but not limited to, "first", "second" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element relative to, or over, another element.

INDUSTRIAL APPLICABILITY

The present disclosure has applicability for use and implementation in providing a track type tractor (TTT) with enhanced protection as compared to conventional designs of tractors. The TTT 100 of the present disclosure is provided with the sweep arrangement 114 and the cross-brace 116 for protecting components that are susceptible to damage from falling debris.

With use of the cover module 140 in the sweep arrangement 114 of the present disclosure, debris directly overhead the TTT 100 can be prevented from falling onto the housing 112 of the engine compartment 108. In cases where the housing 112 is also configured to support components such as, but not limited to, the air inlet system 134, and the exhaust system 136, the cover module 140 offers protection to such components from falling debris. Additionally, the cross-brace 116 of the present disclosure can also be retrofitted by users onto existing machines thereby enhancing an amount of protection offered to not only the components supported by the housing 112 of the engine compartment 108 but also other additional components that may be present on the TTT 100 such as, but not limited to, the lift actuators 144 and the service lights 138.

Besides, the fastening arrangements 148 disclosed herein also help to provide a flexible yet robust connection as compared to traditional methods such as welding by securing the pair of clamps 124 to respective ones of the arms 118 associated with the sweep arrangement 114. Therefore, the fastening arrangements 148 help minimize the possibility of a failure of the cross-brace 116 from encountering impact forces under falling debris. Additionally, when required by an operator of the TTT 100, these fastening arrangements 148 could be loosened to allow an adjustment in the positioning of the bar 126 along the length of the arms 118. Alternatively, when not required by the operator, the cross-brace 116 could be removed altogether from the sweep arrangement 114 on the TTT 100 by merely loosening the fastening arrangements 148.

What is claimed is:

1. A cross-brace for a sweep arrangement of a track type tractor, the cross-brace comprising:
a pair of clamps that are adapted for releasably fastening onto a pair of arms of the sweep arrangement;
a bar having a pair of ends releasably fastened to proximal ends of the pair of clamps; and
a hinge joint to releasably fasten each end of the bar to an associated proximal end of a corresponding clamp, wherein the hinge joint allows relative movement between the pair of clamps when the pair of arms of the sweep arrangement move relative to one another during operation of the track type tractor.

2. The cross-brace of claim 1 further comprising at least a pair of fastening arrangements for clamping each clamp to an associated arm of the track type tractor.

3. The cross-brace of claim 2, wherein at least one fastening arrangement in the pair of fastening arrangements comprises a threaded bolt and a locknut.

4. The cross-brace of claim 2, wherein at least one fastening arrangement in the pair of fastening arrangements comprises a quick-release catch mechanism.

5. The cross-brace of claim 1, wherein an inner circumference of each clamp is configured to correspond with a contour of the associated arm.

6. The cross-brace of claim 1, wherein the pair of clamps are adjustable in position along a length of respective ones of the pair of arms.

7. A system for providing protection to a track type tractor, the system comprising:
a sweep arrangement having a pair of arms supported on a cab of the track type tractor, the pair of arms having first ends disposed rearwardly of the cab, the pair of arms extending forward of an engine compartment of the track type tractor and having second ends coupled with a housing of the engine compartment; and
a cross-brace comprising:
a pair of clamps releasably fastened onto the pair of arms of the sweep arrangement and located at an anterior region of the track type tractor;
a bar having a pair of ends releasably fastened to proximal ends of the pair of clamps; and
a hinge joint to releasably fasten each end of the bar to an associated proximal end of a corresponding clamp, wherein the hinge joint allows relative movement between the pair of clamps when the pair of arms of the sweep arrangement move relative to one another during operation of the track type tractor.

8. The system of claim 7, wherein the cross-brace further comprises at least a pair of fastening arrangements for clamping each clamp to an associated arm of the track type tractor.

9. The system of claim 8, wherein at least one fastening arrangement in the pair of fastening arrangements comprises a threaded bolt and a locknut.

10. The system of claim 8, wherein at least one fastening arrangement in the pair of fastening arrangements comprises a quick-release catch mechanism.

11. The system of claim 7, wherein an inner circumference of each clamp is configured to correspond with a contour of the associated arm.

12. The system of claim 7, wherein the pair of clamps are adjustable in position along a length of respective ones of the pair of arms.

13. The system of claim 7, wherein the sweep arrangement further comprises a cover module extending between the pair of arms.

14. A track type tractor comprising:
a frame;
a cab supported on the frame;
an engine compartment located forwardly of the cab, the engine compartment having
an engine supported on the frame and a housing enclosing the engine therein;
a sweep arrangement having a pair of arms supported on the cab, the pair of arms having first ends disposed rearwardly of the cab, the pair of arms extending forward of the engine compartment and having second ends coupled with the housing of the engine compartment; and
a cross-brace comprising:
a pair of clamps releasably fastened onto the pair of arms of the sweep arrangement and located at an anterior region of the track type tractor;
a bar having a pair of ends releasably fastened to proximal ends of the pair of clamps; and
a hinge joint to releasably fasten each end of the bar to an associated proximal end of a corresponding clamp, wherein the hinge joint allows relative movement between the pair of clamps when the pair of arms of the sweep arrangement move relative to one another during operation of the track type tractor.

15. The track type tractor of claim 14, wherein the cross-brace further comprises at least a pair of fastening arrangements for clamping each clamp to an associated arm of the track type tractor.

16. The track type tractor of claim 15, wherein at least one fastening arrangement in the pair of fastening arrangements comprises a threaded bolt and a locknut.

17. The track type tractor of claim 15, wherein at least one fastening arrangement in the pair of fastening arrangements comprises a quick-release catch mechanism.

18. The track type track type tractor of claim 14, wherein an inner circumference of each clamp is configured to correspond with a contour of the associated arm.

19. The track type tractor of claim 14, wherein the pair of clamps are adjustable in position along a length of respective ones of the pair of arms.

20. The track type tractor of claim 14, wherein the sweep arrangement further comprises a cover module extending between the pair of arms.

* * * * *